United States Patent
Woolmer

(10) Patent No.: US 11,342,810 B2
(45) Date of Patent: May 24, 2022

(54) AXIAL FLUX MACHINE WITH ROTOR AND STATOR WITH CLUTCH MECHANISM TN THE HOLLOW REGION ALONG THE AXIS

(71) Applicant: YASA Limited, Oxford (GB)

(72) Inventor: Tim Woolmer, Oxfordshire (GB)

(73) Assignee: YASA Limited, Oxford (GB)

(*) Notice: Subject to any disclaimer, the term of this patent is extended or adjusted under 35 U.S.C. 154(b) by 805 days.

(21) Appl. No.: 15/768,349

(22) PCT Filed: Oct. 17, 2016

(86) PCT No.: PCT/GB2016/053211
§ 371 (c)(1),
(2) Date: Apr. 13, 2018

(87) PCT Pub. No.: WO2017/064518
PCT Pub. Date: Apr. 20, 2017

(65) Prior Publication Data
US 2018/0323679 A1 Nov. 8, 2018

(30) Foreign Application Priority Data
Oct. 16, 2015 (GB) .................................. 1518377.5

(51) Int. Cl.
*H02K 7/108* (2006.01)
*H02K 21/24* (2006.01)
(Continued)

(52) U.S. Cl.
CPC ............. *H02K 7/108* (2013.01); *H02K 1/182* (2013.01); *H02K 1/20* (2013.01); *H02K 1/2793* (2013.01);
(Continued)

(58) Field of Classification Search
CPC ........ H02K 1/20; H02K 1/182; H02K 1/2793; H02K 15/03; H02K 15/165; H02K 7/003;
(Continued)

(56) References Cited

U.S. PATENT DOCUMENTS 4,689,973 A * 9/1987 Hershberger ......... D06F 37/304
68/23.7
4,700,096 A * 10/1987 Epars ................... H02K 1/2773
310/156.61
(Continued)

FOREIGN PATENT DOCUMENTS

| CN | 102931762 A | 2/2013 |
|---|---|---|
| EP | 1542342 | 6/2005 |

(Continued)

OTHER PUBLICATIONS

European Exam Report issued on corresponding application EP16784270.7, dated Apr. 17, 2019.
(Continued)

*Primary Examiner* — Maged M Almawri
(74) *Attorney, Agent, or Firm* — Meunier Carlin & Curfman LLC

(57) ABSTRACT

An axial flux machine is provided with an integrated clutch assembly, which is housed within the bore of an annulus-shaped stator of the machine. First and second rotors, located either side of the stator are attached to the clutch basket of the clutch assembly, and rotate in unison relative to the stator. A machine housing is provided between the stator and an engagement face of the clutch basket, seated on bearings between the clutch basket and machine housing, to provide a rigid structure.

14 Claims, 9 Drawing Sheets

(51) Int. Cl.
  *H02K 15/03* (2006.01)
  *H02K 7/08* (2006.01)
  *H02K 1/18* (2006.01)
  *H02K 1/20* (2006.01)
  *H02K 1/2793* (2022.01)
  *H02K 7/00* (2006.01)
  *H02K 15/16* (2006.01)
  *H02K 16/02* (2006.01)

(52) U.S. Cl.
  CPC ............ *H02K 7/003* (2013.01); *H02K 7/085* (2013.01); *H02K 15/03* (2013.01); *H02K 15/165* (2013.01); *H02K 16/02* (2013.01); *H02K 21/24* (2013.01); *H02K 2205/09* (2013.01)

(58) Field of Classification Search
  CPC .... H02K 7/085; H02K 7/108; H02K 2205/09; H02K 21/24; H02K 37/08; H02K 37/10; H02K 37/125; H02K 49/046; H02K 49/108
  USPC .............................. 310/75 R, 76, 78, 92, 103
  See application file for complete search history.

(56) References Cited

U.S. PATENT DOCUMENTS

| | | | |
|---|---|---|---|
| 4,866,323 A | 9/1989 | Oudet et al. | |
| 5,773,910 A * | 6/1998 | Lange | H02K 21/125 310/90 |
| 6,137,203 A * | 10/2000 | Jermakian | B60L 7/14 310/191 |
| 6,323,572 B1 * | 11/2001 | Kinoshita | H02K 1/2766 310/156.55 |
| 6,585,066 B1 | 7/2003 | Koneda et al. | |
| 7,262,526 B2 * | 8/2007 | Shiga | H02K 15/03 310/156.28 |
| 8,138,650 B2 * | 3/2012 | Shiga | H02K 1/2786 29/598 |
| 8,836,187 B2 * | 9/2014 | Iwase | B60L 50/61 310/78 |
| 8,838,366 B2 * | 9/2014 | Suyama | B60L 7/24 701/67 |
| 8,961,369 B2 * | 2/2015 | Stuart | F16D 13/54 192/84.961 |
| 8,978,799 B2 * | 3/2015 | Arnold | B60K 6/48 310/78 |
| 9,140,311 B2 * | 9/2015 | Iwase | B60L 15/2054 |
| 9,318,938 B2 * | 4/2016 | Carpenter | H02K 1/182 |
| 9,834,082 B2 * | 12/2017 | Dögel | B60K 6/365 |
| 10,407,178 B2 * | 9/2019 | Regev | B64C 27/14 |
| 10,491,067 B2 * | 11/2019 | Fraser | H02K 1/2786 |
| 2003/0071537 A1 * | 4/2003 | Chen | B60L 3/0061 310/268 |
| 2004/0107703 A1 | 6/2004 | Gustafson | |
| 2006/0033392 A1 * | 2/2006 | Ritchey | H02K 21/12 310/112 |
| 2006/0033393 A1 * | 2/2006 | Ritchey | H02K 1/08 310/112 |
| 2006/0103253 A1 * | 5/2006 | Shiga | H02K 1/2786 310/43 |
| 2007/0202989 A1 * | 8/2007 | Ortmann | B60W 20/40 477/166 |
| 2009/0096314 A1 * | 4/2009 | Atarashi | H02K 16/02 310/156.53 |
| 2010/0213885 A1 * | 8/2010 | Ichiyama | H02K 21/12 310/156.46 |
| 2011/0260566 A1 * | 10/2011 | Odvarka | H02K 1/2793 29/598 |
| 2011/0285238 A1 * | 11/2011 | Kusase | H02K 16/04 310/156.48 |
| 2012/0200187 A1 * | 8/2012 | Sano | H02K 1/2766 310/156.07 |
| 2012/0228965 A1 * | 9/2012 | Bang | H02K 7/1838 310/156.02 |
| 2012/0242198 A1 * | 9/2012 | Kasuya | B60L 50/15 310/68 B |
| 2013/0093276 A1 * | 4/2013 | Kim | H02K 16/00 310/114 |
| 2013/0270955 A1 * | 10/2013 | Lillington | H02K 1/2773 29/598 |
| 2013/0307363 A1 * | 11/2013 | Sano | H02K 1/2766 310/156.01 |
| 2015/0084446 A1 * | 3/2015 | Atar | H02K 11/215 310/43 |
| 2017/0217600 A1 * | 8/2017 | Regev | B64D 35/02 |

FOREIGN PATENT DOCUMENTS

| | | |
|---|---|---|
| EP | 2192673 | 6/2010 |
| EP | 2822150 | 1/2015 |
| JP | S56145350 A | 11/1981 |
| JP | 2012-518377 A | 8/2012 |
| JP | 2012-200074 A | 10/2012 |
| JP | 2013-113431 A | 6/2013 |
| RU | 2216662 C1 | 11/2003 |
| WO | 2008/014253 | 1/2008 |
| WO | 2010092402 A1 | 8/2010 |
| WO | 2012022974 A1 | 2/2012 |

OTHER PUBLICATIONS

Translation of Decision to Grant issued in Russian Application No. 2018115702, dated Jun. 27, 2019.
International Search Report and Written Opinion dated Dec. 22, 2016, from International Application No. PCT/GB2016/053211, 13 pages.
Search Report under Section 17(5) dated Apr. 18, 2016, from Application No. GB1518377.5, 3 pages.
Office Action relating to Japanese Application No. 2018-519764, dated Oct. 6, 2020.
Chinese Office Action, in connection with Application No. 201680060540.6, dated Jun. 28, 2019.
Communication pursuant to Article 94(3) EPC issued in EP 20164666.8, dated May 3, 2021.

* cited by examiner

AXIAL FLUX MACHINE WITH ROTOR AND STATOR WITH CLUTCH MECHANISM TN THE HOLLOW REGION ALONG THE AXIS

FIELD OF THE INVENTION

The present invention relates to an axial flux machine, in particular an axial flux machine comprising a clutch arrangement.

BACKGROUND OF THE INVENTION

In the present invention, we are concerned with axial flux permanent magnet machines. Broadly speaking these have disc- or ring-shaped rotor and stator structures arranged about an axis. Typically the stator comprises a set of coils each parallel to the axis and the rotor bears a set of permanent magnets and is mounted on a bearing so that it can rotate about the axis driven by fields from the stator coils. FIG. 1a shows the general configuration of an axial flux machine of the present invention with a pair of rotors R1, R2 to either side of a stator S—although a simple structure of the present invention could omit one of the rotors. As can be seen there is an air gap G between a rotor and a stator and in an axial flux machine the direction of flux through the air gap is substantially axial.

There are various configurations of axial flux permanent magnet machine depending upon the arrangement of north and south poles on the rotors. FIG. 1b illustrates the basic configurations of a Torus NS machine, a Torus NN machine (which has a thicker yoke because the NN pole arrangement requires flux to flow through the thickness of the yoke), and a YASA (Yokeless and Segmented Armature) topology. The illustration of the YASA topology shows cross-sections through two coils, the cross-hatched area showing the windings around each coil. As can be appreciated, dispensing with the stator yoke provides a substantial saving in weight and iron losses, but one drawback is loss of rigid structure in which a bearing can be mounted to support rotors. Thus preferably for a YASA topology of double rotor, single stator axial flux motor a bearing is mounted within the stator confines and magnetic forces from rotors on either side of the stator are axially balanced. Rotors being designed to resist bending towards the stator.

For such motors, the air gap between rotor and stator for axial flux motors is small typically of the order of 1 mm. Smaller gaps lead to higher motor torque and power output and is seen as beneficial. However as said rotor to stator air gap becomes smaller so manufacturing stack-up tolerances derived from stator and rotor components can lead to variable air gap from motor to motor and hence variable output characteristics. In the limit there is possibility of interference of rotor on stator and hence rotor not being able to rotate and a motor being inoperable or catastrophic motor failure if interference occurs during use.

To overcome the problem of stack-up tolerance for double rotor, single stator, axial flux motors, WO2010/092402 teaches a two stage rotor arranged one at either end of the stator bars, with two air gaps between the ends of the bars and the rotor stages, an annular housing retaining and mounting the stator; a bearing between the rotor and stator. The rotor is thus not otherwise supported in or on the housing and air gaps are set by stator width, bearing length and bearing support faces on rotors. This arrangement provides excellent repeatability of said air gap in motor production, but the teaching of WO2010/092402 lacks flexibility particularly when interfacing with a clutch which is sometimes a requirement for these motors when they are used in hybrid machines. In hybridizing existing machines there is particular commercial value if drive train components can be moved to accommodate an electric machine within the drive chain assembly and to this end an integrated motor clutch is useful.

An integrated clutch and motor is described by Gustafson in US2004/0107703. A radial flux starter motor for a gas turbine is described. The motor is integrated with a high speed overrunning clutch which is situated in a clutch cavity formed within an annular housing portion of the motor housing. However the rotor taught by Gustafson sits on the clutch basket, which would further telescope the motor clutch arrangement. The bearing taught by Gustafon is separated from the Clutch and though mounted within the confines of the rotor the bearing interferes with placement of the clutch and hence the combination motor-clutch is axially longer than it needs to be.

In a similar fashion Thomas U.S. Pat. No. 6,585,066 has integrated a wet multi-plate clutch within a radial flux motor, but there are significant shortcomings from taking this approach including; a large diameter of motor, risk of electrical shorts in end-windings of the stator due to debris from the clutch, difficulty of rotor to stator assembly and increased axial length due to stator end-windings.

As noted above, the prior art describes radial flux machines instead of axial flux machines, both of which have considerations when integrating a clutch assembly.

A radial flux motor is of larger diameter than an axial flux machine if both machines house a concentric clutch, because a radial flux machine has concentric stator and rotor and the rotor hollow cavity must be large enough to house a clutch. This pushes out the stator diameter by at least the thickness of the rotor stage. In comparison an axial flux machine has rotors which sit parallel to the stator and an equivalent axial flux machine has a diameter less than its radial counterpart by at least the thickness of the radial flux rotor annulus.

A radial flux machine has exposed stator end windings which protrude beyond the width of the rotor stage. Stator end-windings thereby increase axial length of a motor for no power or torque gain. An equivalent axial flux machine of the present invention has stator bars on which are wound coils, there being no end-windings the axial length of the stator is thereby increased only by the rotor axial length which is comparable to the over-hang length of stator end-windings. This is a significant reason for improved power and torque density from axial flux machines.

The end-windings are also prone to catching debris which can lead to electrical shorts and debris in this instance is made by the clutch during normal use. Not all axial flux machines have protected stator coils, but the stator of the present invention has enclosed stator coils which are protected from clutch wear debris and thereby are not prone to electrical short circuits.

During assembly of an integrated radial flux machine seen in U.S. Pat. No. 6,585,066 it is critical to maintain separation between rotor and concentric stator, wherein considerable attractive forces occur. The challenge of radial flux machine assembly is compounded when integrated around a clutch and having bearings that are outboard of the stator, rotor and clutch assembly. Assembly of these components must be done on a bench with rigid tooling fixtures to align rotor with stator and then attach the clutch assembly. We have therefore appreciated the need for an improved axial flux machine comprising an integrated clutch mechanism.

SUMMARY OF THE INVENTION

The present invention therefore provides an axial flux machine comprising: a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine; a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine; a clutch mechanism located co-axially with the axis of the machine and located within the hollow regions of the rotor and stator, the clutch mechanism comprising: a clutch basket comprising a first set of one or more clutch plates and having a first engagement surface for coupling torque in or out of the machine; and a clutch plate bearer comprising a second set of one or more clutch plates and having a second engagement surface for coupling torque in or out of the machine, each set of the one or more clutch plates being arranged to be selectively driven in and out of engagement with one another, wherein the rotor is mounted on the clutch basket.

Such an arrangement provides a machine in a very compact package. By incorporating the clutch mechanism within the bore of the radially hollow regions at the centre of the stator and rotor, a suitable clutch mechanism can be housed within the confines of the machine. Machines comprising clutch assemblies having a 150 mm diameter have been incorporated into an axial flux machine having an outer diameter of 325 mm to 335 mm and an axial length of no more than 100 mm, whilst still being able to provide up to 500 Nm of torque. This offers a machine that may easily be integrated into a hybrid power train, or even into a single unit power train with an integrated clutch.

The machine may also comprise a machine housing enclosing the rotor, the machine housing being mounted to the stator housing. The machine may also comprise a radial bearing between the machine housing and the first engagement surface, and a clutch plate bearer bearing between the machine housing and the second engagement surface, the rotor being co-journaled with the first engagement surface. These arrangements provide a very rigid machine structure.

The clutch may comprise a clutch piston for driving the sets of clutch plates in and out of engagement with one another. Furthermore, the machine may also comprise a piston spring, for biasing the clutch piston. The clutch may be a wet or dry clutch.

The machine may also comprise a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction. The double-rotor variant described is preferred, since this increased the overall torque output of the machine, as the magnetic field at both ends of the stator bars is utilized for motive force.

When there are two rotors, the clutch basket extends axially in the hollow regions and the second rotor is mounted on the clutch basket such that the first and second rotors rotate together. A second machine housing may also be provided to enclose the second rotor, the second machine housing being mounted to the stator housing. Again, this provides a rigid structure.

The first engagement surface is an input to the machine, and the second engagement surface is an output of the machine. Alternatively, the first engagement surface is an output of the machine, and the second engagement surface is an input to the machine. In either case, the first and/or second engagement surfaces may comprise splines for engagement with respective shafts.

The stator housing may defines a chamber incorporating cooling medium in contact with the coils to cool the coils, the stator housing including a port for supply and a port for drainage of the cooling medium. This enables heat to be extracted from the machine.

The machine is a toque source, a motor or generator.

The present invention also provides a method of assembling an axial flux machine comprising a clutch mechanism, the method comprising: supplying a clutch mechanism, the clutch mechanism comprising a clutch basket comprising a first set of one or more clutch plates and having a first engagement surface for coupling torque in or out of the machine, and a clutch plate bearer comprising a second set of one or more clutch plates and having a second engagement surface for coupling torque in or out of the machine, the clutch basket and clutch plate bearer being mounted for rotation about an axis of the machine; attaching a first rotor to an outer surface of the clutch basket, the first rotor comprising an annulus having a hollow central region and having a set of permanent magnets disposed circumferentially at intervals around the axis of the machine facing inward of the machine; applying a spacer to the surface of first rotor comprising the permanent magnets; arranging a stator co-axially with the clutch and adjacent the first rotor such that the spacer is contacted by a first side of the stator and the first rotor, the stator comprising a stator housing enclosing a plurality of stator bars disposed circumferentially at intervals around the axis of the machine, each of the stator bars having a set of coils wound therearound for generating a magnetic field, and the stator housing having an annular shape forming a hollow region about the axis of the machine, the clutch basket sitting within the hollow region of the stator; and pulling the stator away from the first rotor to provide an airgap between the stator and first rotor.

In the method, the step of pulling the stator away from the first rotor comprises: arranging a clutch radial bearing on an outer surface of the first engagement surface of the clutch basket; arranging a machine housing on a side of the stator opposite the side adjacent to the first rotor, the machine housing extending between the stator housing and the clutch radial bearing; providing an axial shim in an axial path between the machine cover and the clutch basket; and attaching the machine housing to the stator housing, wherein the axial shim has a thickness that defines an axial position of the machine housing relative to the clutch basket such that when the machine cover is driven into attachment with the stator housing, the stator moves axially away from the first rotor. The axial shim may be provided between the machine housing and an outer race of the clutch radial bearing, or between the clutch basket and an inner race of the clutch radial bearing.

The step of providing an axial shim may comprise: measuring at least one axial length of a portion within the machine; and selecting an axial shim thickness depending on the at least one measured axial length such that the step of attaching the machine cover to the stator housing causes sufficient axial movement of the stator in order to move the stator axially away from the first rotor. The at least one measured axial length of a portion within the machine is one or more of: an axial distance between the clutch radial bearing and the first rotor; and an axial length of the machine housing.

The clutch basket may comprises a first rotor engagement face for attaching the first rotor thereto, the first rotor engagement face being axially positioned on the clutch basket to define the axial position of the first rotor, and to define the axial airgap between the first rotor and stator.

The step of pulling the stator away from the first rotor preferably releases the spacer from between the first rotor and stator.

The method may further comprise: attaching a second rotor to the outer surface of the clutch basket, the second rotor comprising an annulus having a hollow central region and having a set of permanent magnets disposed circumferentially at intervals around the axis of the machine facing inward of the machine, the second rotor being attached at a position of the clutch basket that is adjacent a second side of the stator, the second side of the stator being opposite the first side of the stator, wherein the step of attaching a second rotor occurs prior to the step of pulling the stator away from the first rotor, and wherein the step of pulling the stator away from the first rotor comprises centering the stator between the first and second rotors.

When the machine comprises the second rotor, the machine housing covers the second rotor, which protects the rotor from the external environment.

When there are two rotors, the at least one measured axial length of a portion within the machine may also be one or more of: an axial distance between the clutch radial bearing and the second rotor; and an axial length of the machine housing.

When there are two rotors, the clutch basket comprises a second rotor engagement face for attaching the second rotor thereto, the second rotor engagement face being axially separated from the first rotor engagement face on the clutch basket to define the axial distance between the first and second rotors, and to define the axial airgaps between the first rotor and stator and the second rotor and stator.

The rotor may be attached to the clutch basket by push-fit, bolt or screw fixings, or hot shrink fit.

The spacer may have an axial thickness that is less than a desired air-gap between the first rotor and stator of the assembled machine.

In any of the above methods, the method may further comprise: arranging a clutch plate bearing on an outer surface of the second engagement surface of the clutch plate bearer; arranging a machine housing to cover the first rotor, the machine housing extending between the stator housing and the clutch plate bearing; and attaching the machine housing to the stator housing. The provides a rigid structure, and covers and encloses the first rotor from the external environment.

LIST OF FIGURES

The present invention will now be described, by way of example of, and with reference to the accompanying figures, in which.

DETAILED DESCRIPTION OF THE PREFERRED EMBODIMENTS

Figure 1A:
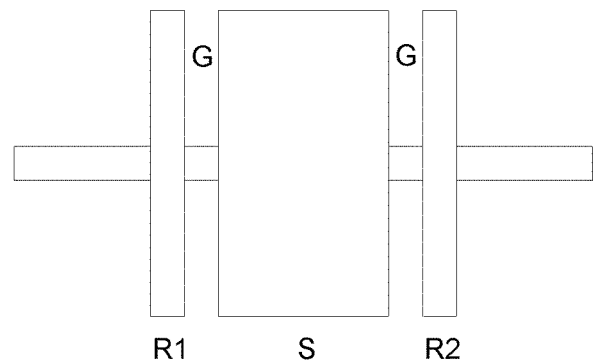
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
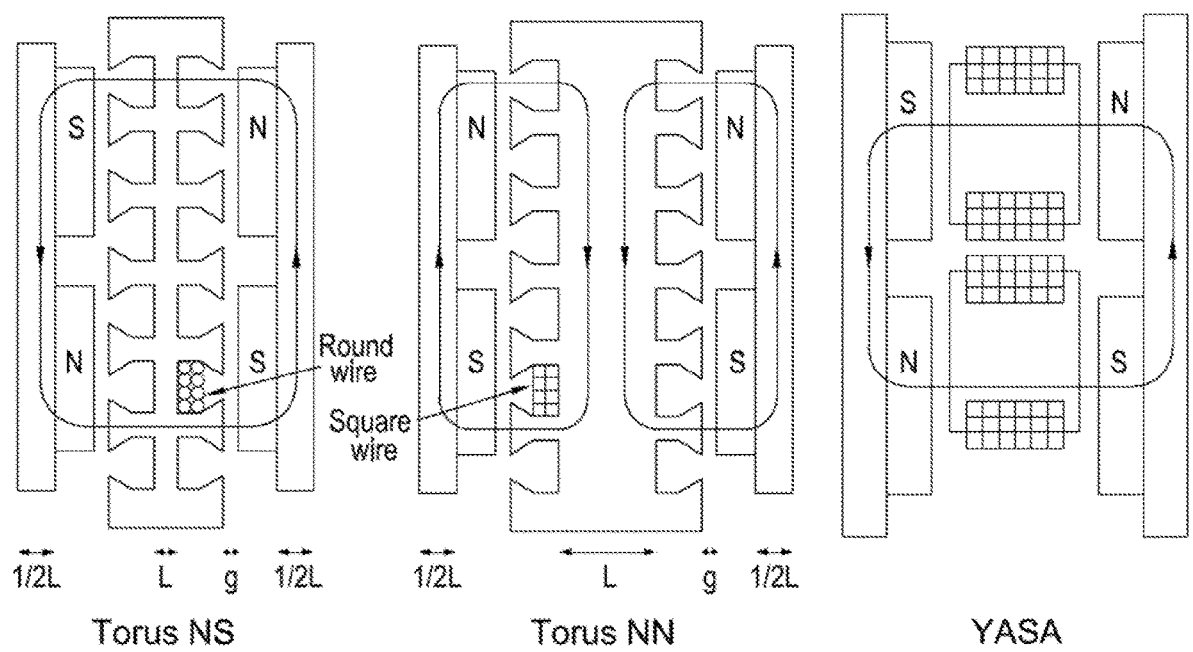
Figure 1C:
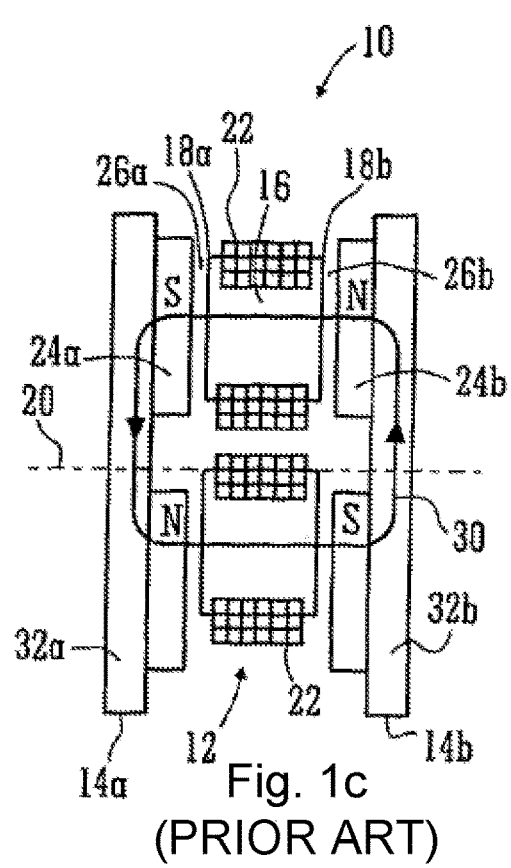
Figure 2:
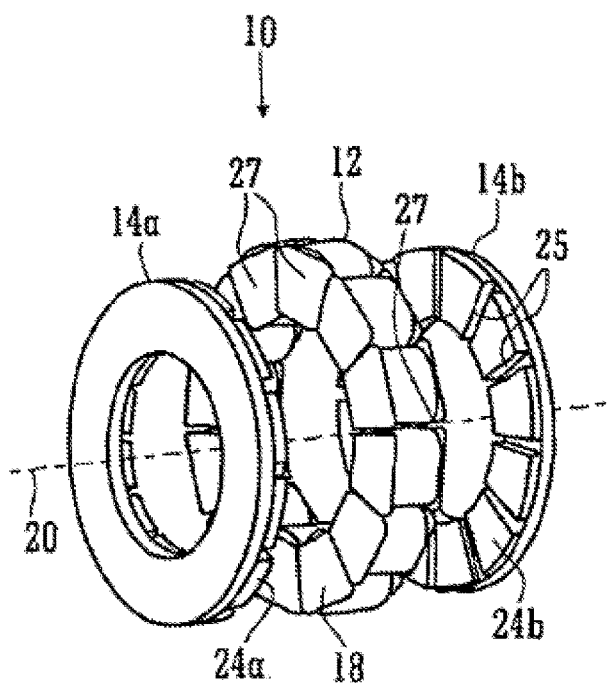
FIG. 2 shows a perspective view of the YASA machine of FIG. 1c.
Figure 3:
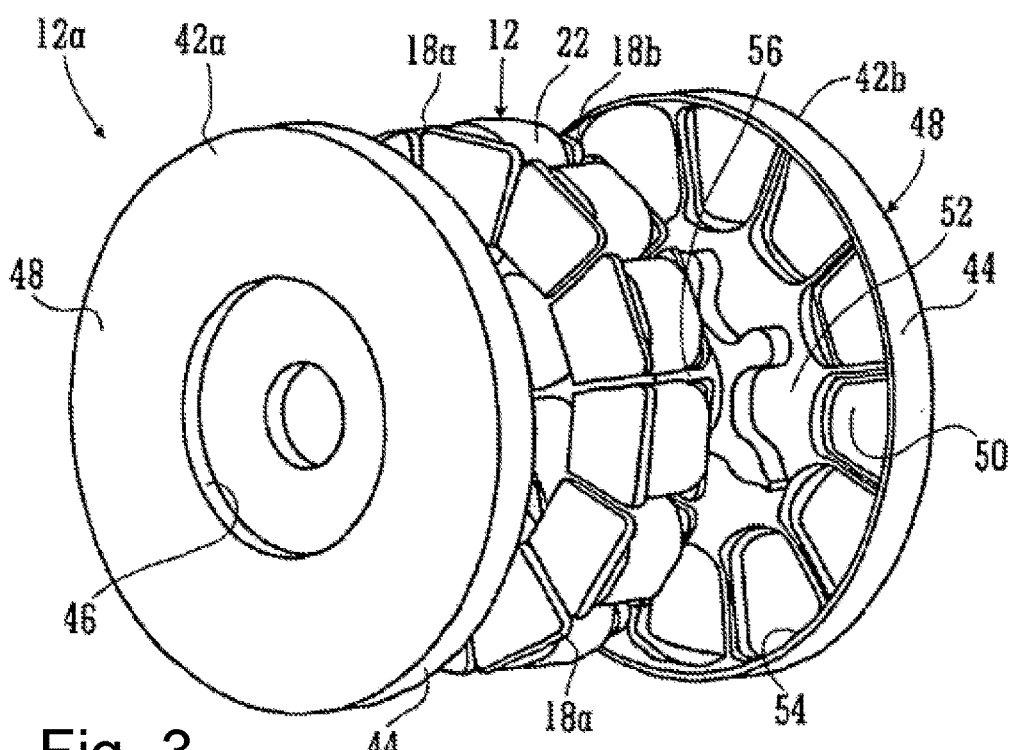
FIG. 3 shows a perspective exploded view of a stator and stator housing for a YASA machine.
Figure 4:
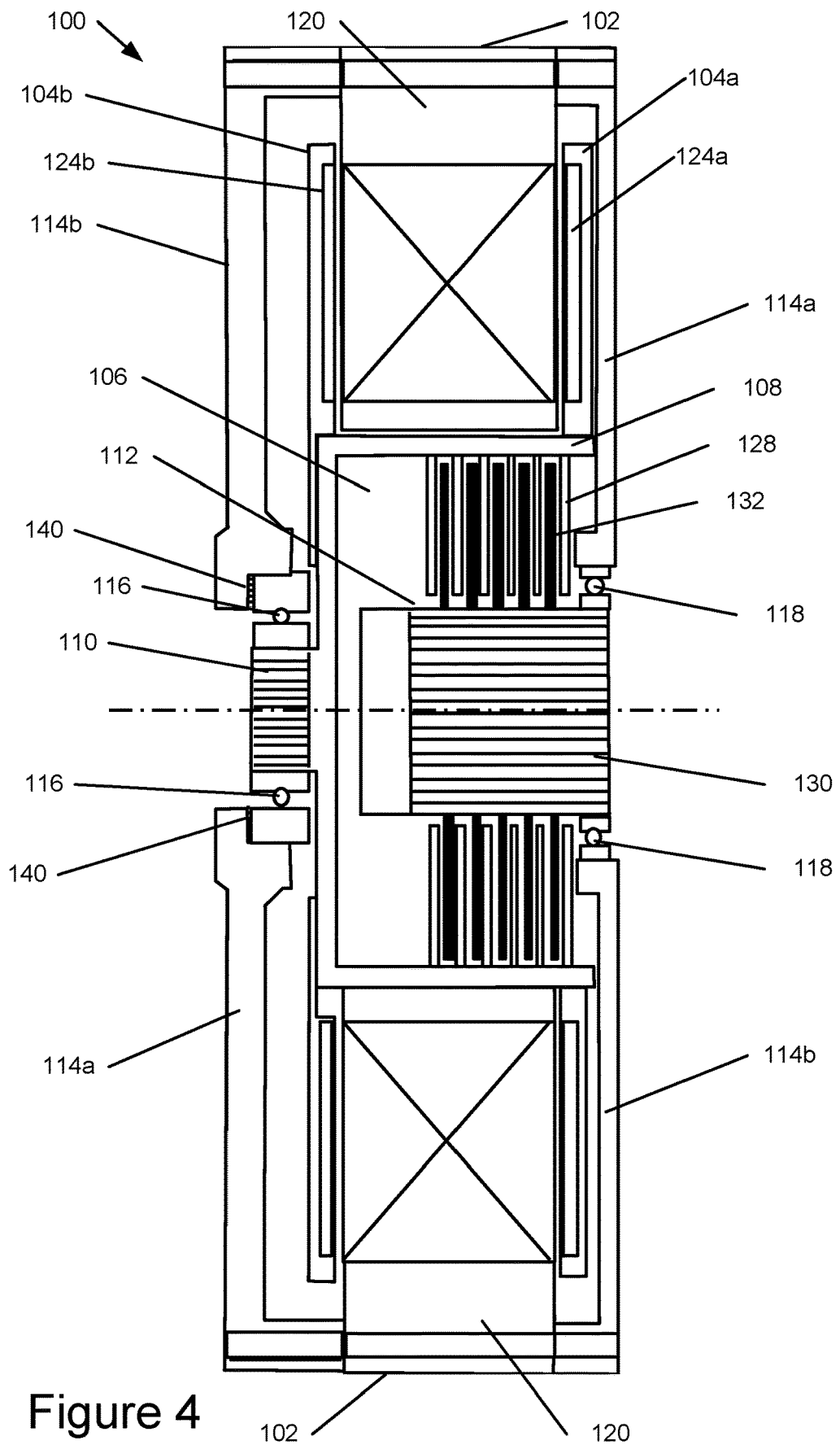
FIG. 4 shows an axial flux machine according to the present invention.

Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastic material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18*a*,*b* of the stator bars 16 and serve to locate the stator coil assemblies 16, 22, 18*a*,*b* when the two clam shell housings 42*a*, *b* of the stator 12*a* are assembled together. The stator housing 42*a*, *b* defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42*a*,*b* is provided with ports that allow cooling medium such as oil to be pumped into the spaces 52,54,56 to circulate around the coils and cool them.

The coil cores may be laminated with the inter-lamination insulation parallel to the desired flux direction. However the coil cores may also be formed from soft-iron particles coated with electrical insulation and moulded to a desired shape (soft magnetic composites—SMC), being bound together by the insulation matrix. An example SMC may comprise glass-bonded iron particles, a thin layer (typically <10 µm) of glass bonding and mutually electrically insulating the iron particles, leaving some residual porosity. A high-temperature, high-pressure compaction process is used to mould the component into a complex shape, capable of producing three-dimensional magnetic flux patterns with an excellent form factor and enabling a high fill factor winding to be employed, wound straight onto SMC teeth. Conveniently the shoes and stator bar may be formed separately and subsequently assembled; a shoe may have a central region with an axial direction of minimum reluctance and an outer region with a radial direction of minimum reluctance (see WO2012/022974).

FIGS. 4 to 10 show an axial flux machine 100 according to the present invention. Whilst these figures show an axial flux machine having two rotors either side of a stator, it is envisaged that the present invention is also applicable to axial flux machines having only one rotor disposed on one side of the stator, in which case one of the rotors shown in the figures is not present and a yoke provides the magnetic return path.

The axial flux machine 100 comprises a stator 102 and a rotor 104, which has two stages 104*a*, *b*, disposed either side of the stator 102 and axially spaced apart from the stator to provide axial air gaps.

A clutch assembly 106 is provided between the stator and rotor. The clutch assembly 106 comprises a clutch basket having one or more clutch plates 128 located on an inner surface, and the clutch assembly 106 also comprises a clutch plate bearer 112, which also has one or more clutch plates 132 located on an outer surface. The clutch plate bearer 132 sits in, and rotates, co-axially within the clutch basket 108 such that the respective clutch plates sit interdigitated with one another, and may be driven in and out of engagement with one another. When the clutch plates are engaged, the clutch basket and clutch plate bearer rotate in unison. When disengaged, the clutch basket and clutch plate bearer may rotate independently.

Figure 5:
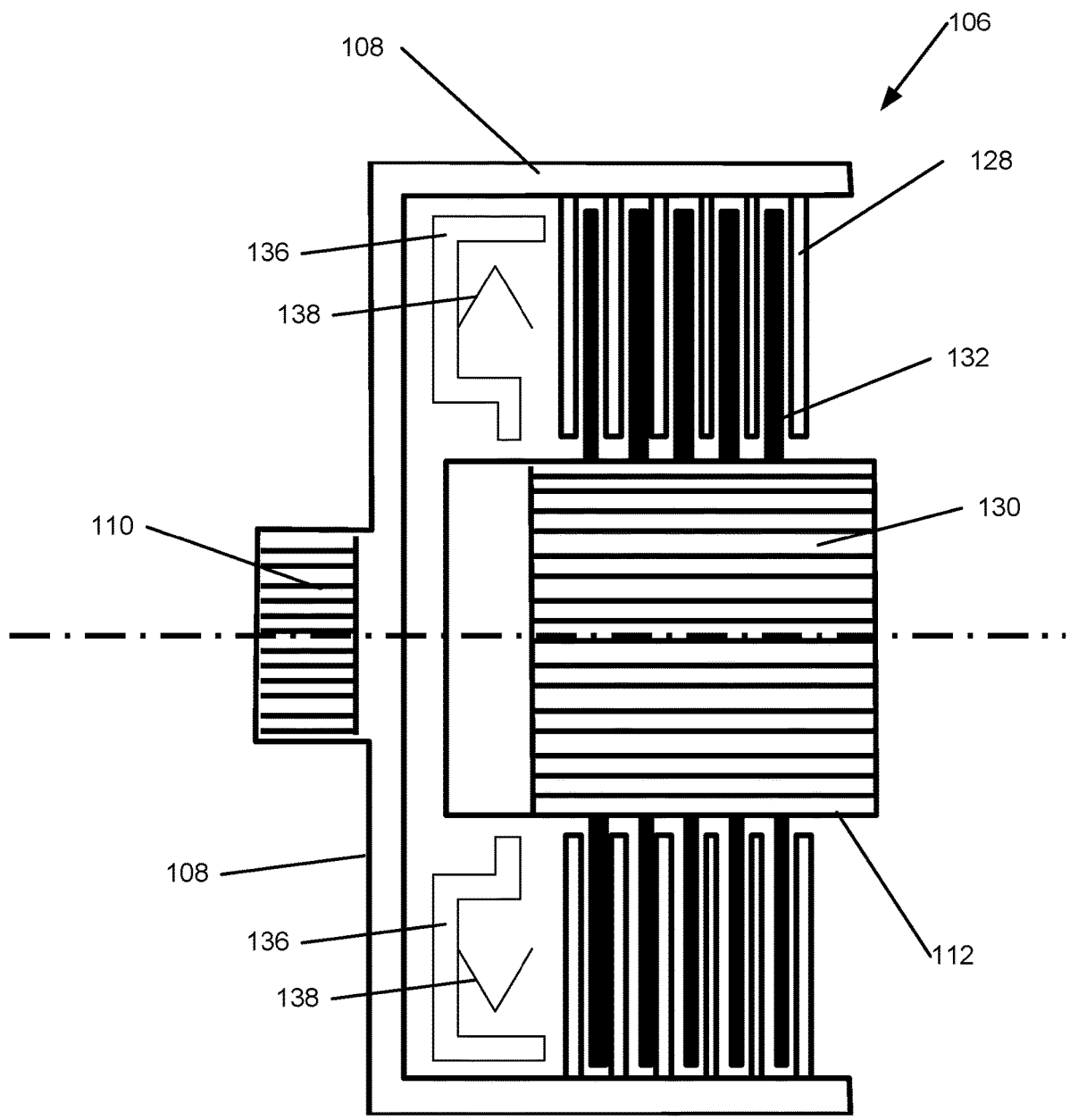
FIG. 5 shows a simplified view of a clutch mechanism used in the axial flux machine of FIG. 4.
Figure 6:
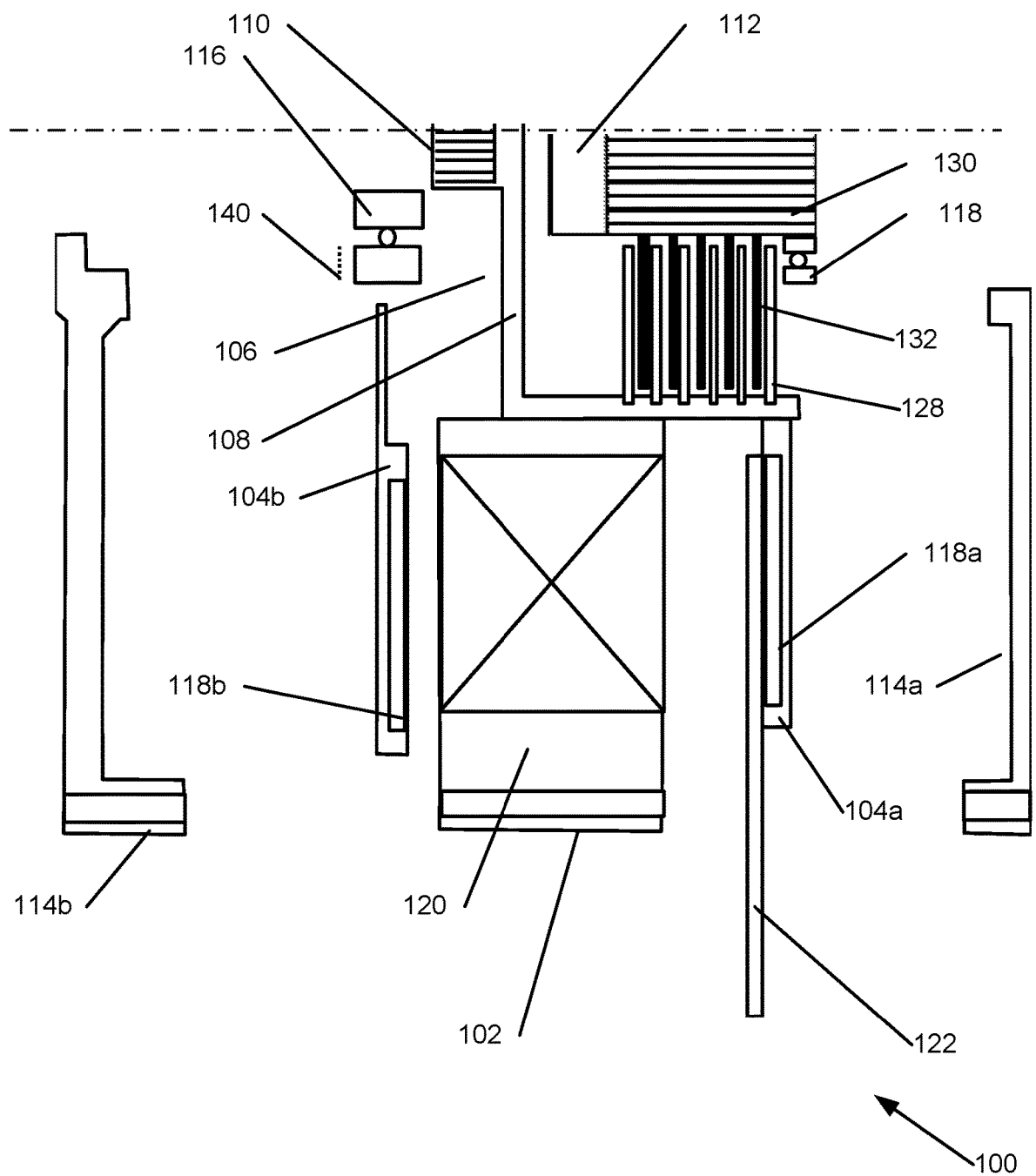
FIG. 6 shows the lower half of the axial flux machine of FIG. 4 in exploded view.
Figure 7:
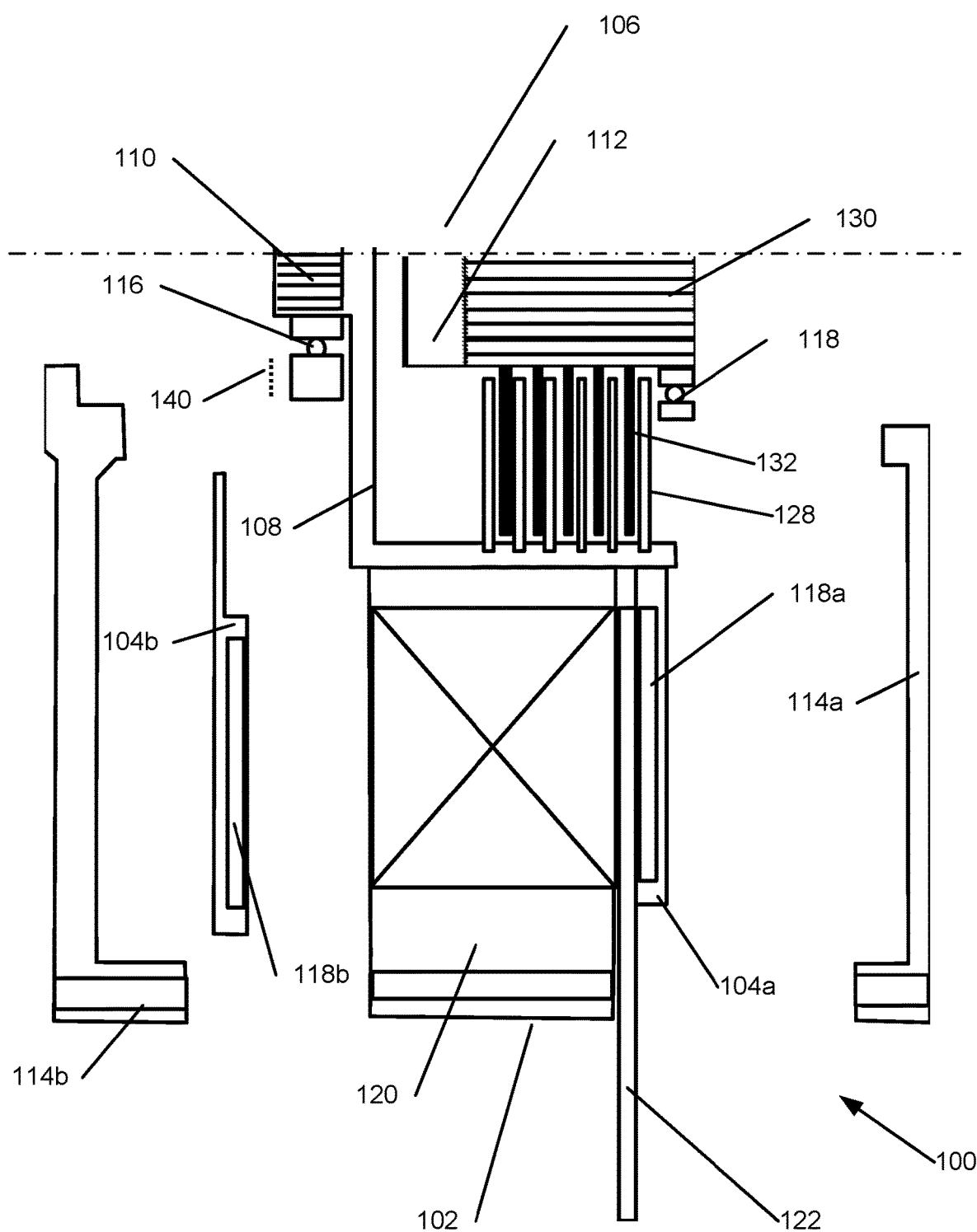
FIG. 7 shows the lower half of the axial flux machine of FIG. 4 in partial exploded view.
Figure 8:
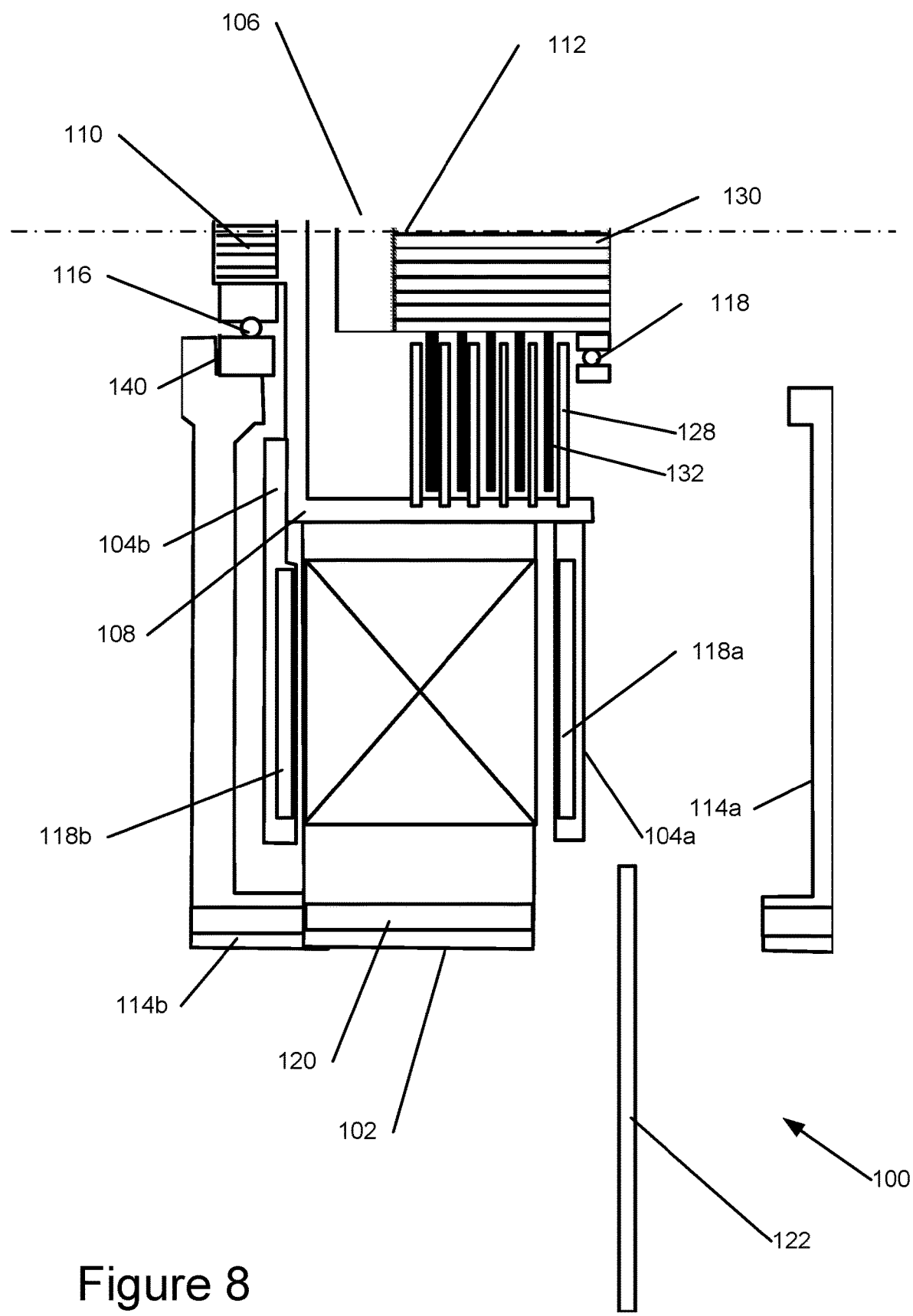
FIG. 8 shows the lower half of the axial flux machine of FIG. 4 in partial exploded view.
Figure 9:
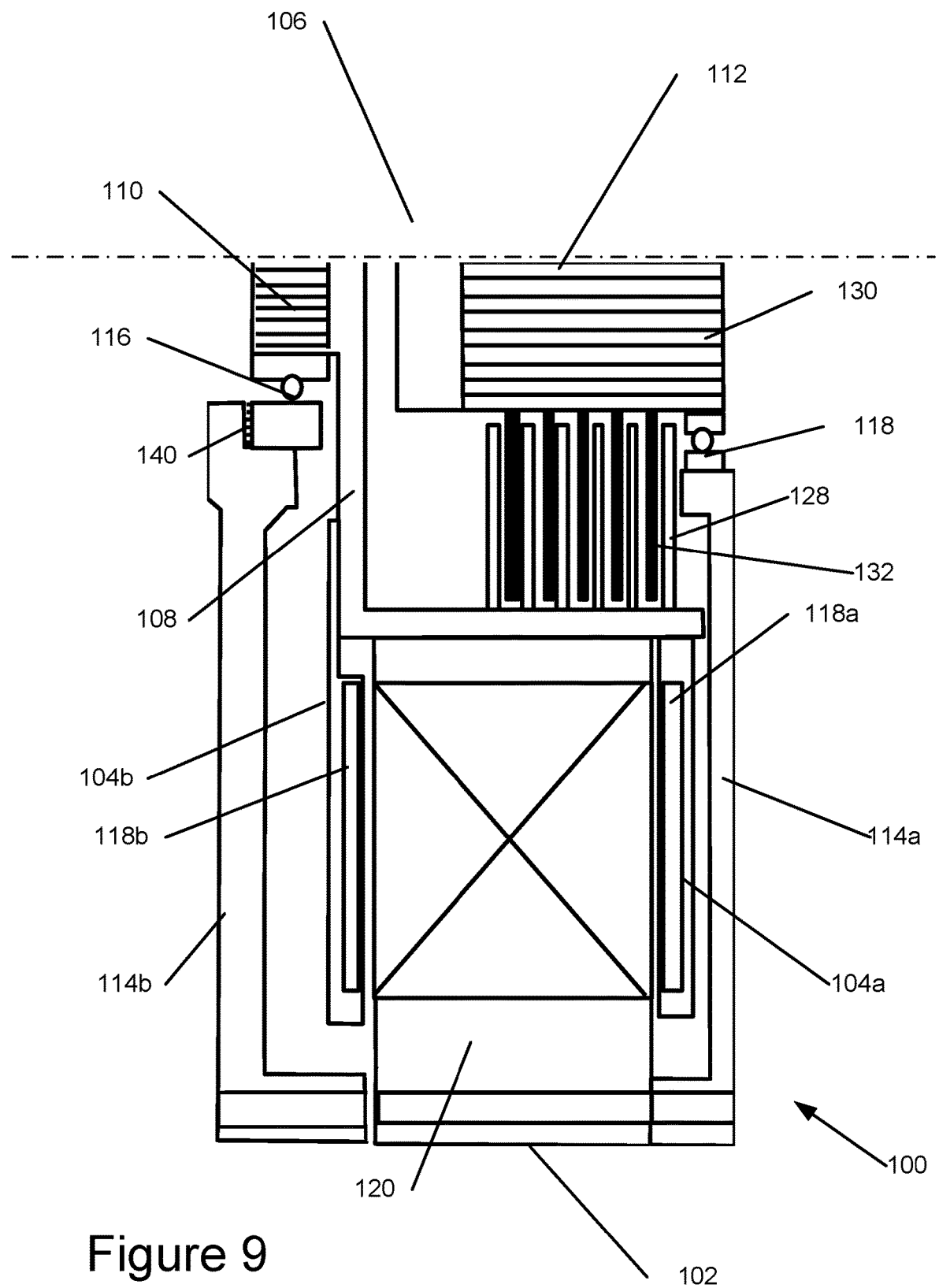
FIG. 9 shows the lower half of the axial flux machine of FIG. 4 in assembled form.

FIG. 5 shows a simplified driving mechanism for the clutch 106, which comprises a clutch piston 136, which is driven (for example hydraulically or by a cable) to drive the clutch plates 128, 132 into engagement with one another. A clutch piston spring 138 is arranged to return the piston 136 to its resting position and thus release the clutch plates 128, 132 from engagement. Of course, it would be apparent to the reader that the clutch piston 136 and piston spring 138 could be arranged such that the piston is biased by the spring 138 in a position to drive the clutch plates 128, 132 into engagement with one another, and the clutch piston 136 is driven (for example hydraulically or by a cable) away from the clutch plates 128, 132 such that the clutch plates are released from engagement. The chosen orientation will depend on the application for such a machine.

We will describe the axial machine having a wet multi-plate clutch assembly. However, it should be understood that the invention is also applicable to dry multi-plate clutch assemblies, as well as wet or dry single-plate clutch assemblies.

The clutch basket 106 has an engagement surface 110 and the clutch plate bearer 112 has an engagement surface 130. Each of these engagement surfaces 110, 130 enables coupling to the machine via shafts or other means in order to provide torque to the machine or receive torque from the machine. The engagement surfaces 110, 130 are shown with splined engagements, although other connection mechanism between a shaft and the respective engagement surface 110, 130 would be apparent to the reader. The engagement surface 110 of the clutch basket 106 may be an input or output of the machine. The engagement surface 130 of the clutch plate bearer 112 may be an input or output of the machine.

The first rotor 104*a* and second rotor 104*b* are mounted on the clutch basket 108 such that the first and second rotors rotate in unison, and relative to the stator. The rotors 104*a*,*b* have radial walls mounting a set of permanent magnets 118*a*,*b*. Either or both of rotors 104*a*,*b* provide a drive input/output, in the case of a generator/motor respectively, but for simplicity this is not shown in the figures.

The stator 102 has a housing 120 comprising first and second radial walls and generally cylindrical inner and outer walls, defining a chamber within which coolant may circulate. The housing encloses a set of stator coils; these and their electrical connections are not shown for simplicity. The coils are wound around pole pieces (also not shown for simplicity).

The machine is provided with first and second machine housings 114*a*,*b*, disposed, and mounted to, either side of the stator housing.

A clutch radial bearing 116 is seated on an outer surface of the clutch basket, with an outer race of the clutch radial bearing 116 supporting the inner radial end of the machine housing 114*b*. A clutch plate bearer bearing 118 is seated on an outer surface of the clutch plate bearer 112, with an outer race of the clutch plate bearer bearing 118 supporting the inner radial end of the machine housing 114*a*. The clutch basket 108 (in unison with the rotors 104*a*,*b*) and clutch plate bearer 112 may thus rotate relative to the machine housings 114*a*,*b* and stator 102.

Various modes of operation may be envisaged as follows:

a) An axial flux motor with integrated clutch of the present invention in a normally not engaged bias may be interfaced with an Internal Combustion (IC) engine in a powertrain such that the IC engine may drive the clutch bearer 112 and plates 132 via interface 130 and also a coaxial shaft (not shown) passing through input/output interface 110 which shaft engages with e.g. separate clutch and a gearbox such that the IC engine may interface with a gearbox directly when the clutch is not engaged and on engaging of the clutch of the present invention the electric motor may; start the IC engine, add additional torque to an already running IC engine or generate electrical power from the IC engine;

b) Alternatively a motor clutch of the present invention may be used as a standalone power unit to drive machinery with clutch plates biased in a normally closed position so that disengagement stops the motor drive torque being applied, or as with some machine tools the clutch is biased in a normally disengaged state so that drive may be applied by an operator intermittently at will.

c) Alternatively an IC engine may be interfaced with a normally open clutch-motor of the present invention via clutch bearer 112 and plates 132 via interface 130 and can be used to generate power at will by engaging the clutch.

d) Alternatively two or more motor clutches of the present invention may be ganged together such that more or less power and torque may be derived from the combination of one or more of the systems when in a motor mode and conversely electrical power when in generator mode.

For one of average skill in this field it will be apparent there are many combinations and machines to which a compact motor-clutch of the present invention may be applied.

The machine housings 114a,b together with the stator housing, and bearings 116, 118 against the clutch basket 108 and clutch plate bearer 112 form a rigid structure for the machine.

In the arrangement of the present invention, it can be seen that the machine can be offered in a very compact package. By incorporating the clutch mechanism 106 within the bore of the radially hollow regions at the centre of the stator and rotors, a suitable clutch mechanism 106 can be housed within the confines of the machine housing 114a,b. Machines comprising clutch assemblies 106 having a 150 mm diameter have been incorporated into an axial flux machine having an outer diameter of 325 mm to 335 mm and an axial length of no more than 100 mm, whilst still being able to provide up to 500 Nm of torque. This offers a machine that may easily be integrated into a hybrid power train, or even into a single unit power train with an integrated clutch.

As described previously, the machine may be a motor, a torque source, or a generator.

Method of Assembly of an Integrated Machine and Clutch

We will now describe the method of assembly of the axial flux machine and clutch.

The YASA (Yokeless And Segmented Armature) motor of the present invention preferably has a single annular stator on either side of which there lies a rotor with permanent magnets arranged with north and south poles lying parallel to the rotation axis, interacting with armature pole pieces across air gaps, one for each rotor and stator side. This arrangement balances the considerable attractive force of permanent magnet rotors towards the stator and the stator thereby receives a net attraction of close to zero. Because rotors lay on either side of the stator there is sufficient room to place a multi-plate wet clutch within the confines of the stator and rotor back-irons/yokes, the clutch bearings providing axial and radial stability and rotational freedom to the rotors.

In general the assembly of permanent magnet dynamo electric machines whether axial or of radial topology is a challenging task and requires careful consideration of how rotors and stator should be brought together so as not to damage these components and certainly to avoid touch-down of rotor on stator.

The following method of assembly takes special advantage of the unique topology of a single stator, double rotor axial flux motor enabling a simple and elegant assembly method around a clutch. However the assembly method may also be applied to a single rotor, single stator topology.

We will first describe the method of assembly in relation to the single stator, double rotor axial flux motor topology.

Multi-plate wet clutches are particularly challenging to fit within a short axial length precisely because of the axial length required of a multi-plate stack and the following description of assembly teaching a solution to this most challenging topology, may also be applied to single plate wet and dry clutches for which assembly within the short axial length of an axial flux motor is considerably easier. Indeed because rotors are axially placed the stator diameter may accommodate a single dry plate clutch without recourse to enlarging the motor diameter, which would necessarily occur for the concentric motor topology of radial machines.

With reference to FIGS. 6 to 10 a hydraulically actuated multi-plate clutch 106 is held in a fixture and a right hand side (first) rotor 104a is fixedly attached to the outer periphery of the clutch basket 106. Attachment may be by push-fit, bolt or screw fixing, or hot shrink fit or any other appropriate attachment method that holds the rotor "as one" with the clutch basket 106.

With the right hand (first) rotor 104a in place, one or more spacers 122 are then applied to the magnet i.e. stator facing face of the right-hand rotor 104a. Such spacer 122 may be a single component annular disc with keyhole shaped central aperture to allow removal by radial movement, or it may be multi-component pieces placed to provide even support to the rotor. Advantageously the spacers 122 may be marginally ferromagnetic so as to be held lightly in position when placed on the rotor carrying permanent magnets. The total thickness of the spacers is preferably thinner (for example, ~100 microns) of the desired stator to rotor axial airgap.

Having placed the spacers 122 thereby protecting the rotor from touch down by the stator 102, the annular stator 102, having a central aperture larger than the diameter of the clutch basket 106, is jacked into place with clutch basket 106 positioned centrally within the stator aperture, the annular stator 102 is allowed to approach and then contact the spacer 122 protecting the first rotor 104a, the spacer 122 being firmly compressed by the stator 102 to rotor 104a attractive force and fully supporting the stator 102. The jacking arrangement may then be removed.

With stator 102 and right-hand (first) rotor 104a in place firmly contacting the spacer 122 separating rotor and stator from touching and maintaining a stator to rotor airgap just short of the optimum, the left-hand (second) rotor 104b is jacked towards the stator 102 and is attached fixedly to the clutch basket 106. The rotor attachment faces on the clutch basket 106 are of axial separation to accept the stator 102 and provide optimum air gaps between stator 102 and left 104b and right 104a hand rotors.

The assembly methods of stators provides a narrow and known tolerance on stator 102 width such that from motor to motor a small and acceptable variation in physical air gap occurs when a stator 102 is placed between right 104a and left-hand 104b rotors. It remains for the stator 102 to be pulled away from the first rotor 104a and centred between the rotors 104a,b to give an equal air gap between stator 102 and either rotor 104a,b.

A clutch radial bearing 116 is arranged on the outer surface of the engagement surface of the clutch basket 106. Its axial faces are reference points with respect to the right and left-hand rotor 104a,b axial positions and may thus be used to define a position relative to the clutch basket 106 in order to pull the stator 102 away from the first rotor 104a in order to achieve an optimal or desired gap between the first and second rotors 104a,b during assembly.

The axial position of the stator 102 is adjusted during assembly using a machine housing 114b, which extends between the clutch radial bearing 116 and the stator housing 120. The basic principle is that by using a relatively stiff machine housing 114b and fixing one end of the machine housing 114b to the outer race of the clutch radial bearing 116 (which is at a known position relative to the rotors 104a,b on the clutch basket 106), attaching the machine housing 114b to the stator housing 120 will pull the stator 102 away from the first rotor 104a and into a central axial position between the first and second rotors 104a,b.

In practice, one or more shims 140 (of known thickness) may be required to set the correct axial distance between the machine housing 114b and the clutch basket 106. By measuring one or more of the following axial lengths/distances, a desired position of the machine housing 114b relative to the clutch basket 106 may be calculated, and the desired shim 140 thickness chosen:

an axial distance between the clutch radial bearing 116 and the first rotor 104a;
an axial distance between the clutch radial bearing 116 and the second rotor 104b; and
an axial length of the machine housing 114b.

Figure 10:
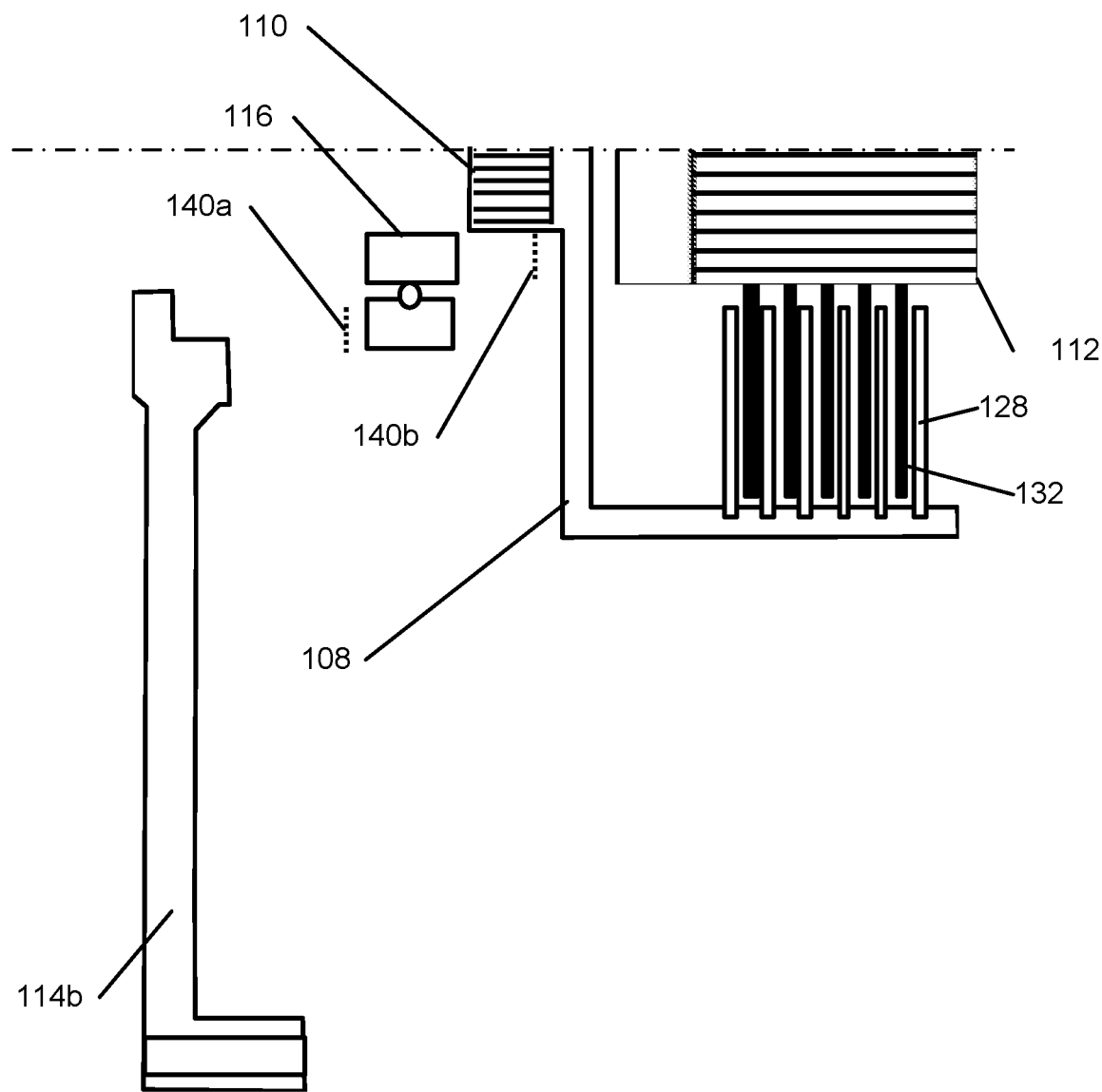
FIG. 10 shows alternative positions of the shim.

With reference to FIG. 10, the shim 140a may sit either between the outer race of the clutch radial bearing 116 and the machine housing 114b (in which case the axial position of the machine housing 114b moves relative to the clutch basket 106 and clutch radial bearing 116), or the shim 140b may sit between the inner race of the clutch plate bearing 116 and the clutch basket 106 (in which case the axial position of the clutch radial bearing 116 and machine housing 114b are moved relative to the clutch basket 106).

Once the shim 140 is in place, the machine housing 114b is attached to the clutch radial bearing 116 and the machine housing 114b is applied to the stator housing 120. Bolts connecting stator 120 outer housing to left-hand machine housing 114b are tightened and in so doing pull the stator 102 into a central position between right and left-hand rotors 104a,b. The spacers 122 providing separation between stator 102 and right-hand rotor 104a now fall loose (since the first rotor and stator are separated) and may be easily removed.

Finally the right-hand machine housing 114a may be applied and bolted to the stator housing 120, with the inner periphery of the machine housing 114a supported by a clutch plate bearer bearing 118 mounted to the second engagement surface of the clutch plate bearer 112.

The right and left-hand machine housings 114a,b together with the stator outer housing 120 and clutch 106, form a rigid box like structure which readily supports the machine rotors 104a,b and is easily manufactured.

With regards to a method of assembly when used for assembling a machine comprising a single stator and single rotor, the steps follow the same flow as detailed above. The clutch mechanism is provided, the first rotor is attached to the clutch basket, as above. Then the spacer is applied to the first rotor prior to the stator being brought into position about the clutch basket and being brought into contact with the spacer.

Again, the clutch radial bearing is positioned on the first engagement surface of the clutch basket, and a machine housing is positioned between the clutch radial bearing and the stator housing (but this time extending over the area in which the second rotor would go, but is not present in this method), and the machine housing being brought into contact and attached to the stator housing pulls the stator away axially from the first rotor. Again, a shim is chosen to position the machine housing at the desired axial position in order to pull the stator away from the rotor to the desired axial position when the machine housing and stator housing are attached to one another. The shim thickness is chosen as described above (although not with reference to the second rotor, since there is no second rotor in this method).

As with the first method, the machine housing covering the first rotor may also be applied to the machine as described above.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. An axial flux machine comprising:
   a stator comprising a stator housing enclosing a plurality of stator bars disposed circumferentially at intervals around an axis of the machine, each of the stator bars having a set of coils wound therearound for generating a magnetic field, and the stator housing having an annular shape forming a hollow region about the axis of the machine;
   a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, and the rotor formed of an annulus and having a hollow central region about the axis of the machine;
   a clutch mechanism located co-axially with the axis of the machine and located fully within the hollow regions of the rotor and stator, the clutch mechanism comprising:
      a clutch basket having a radially inner surface and a radially outer surface, the radially inner surface of the clutch basket comprising a first set of one or more clutch plates extending radially inwardly and the clutch basket having a first engagement surface for coupling torque in or out of the machine; and
      a clutch plate bearer comprising a second set of one or more clutch plates and having a second engagement surface for coupling torque in or out of the machine, each set of the one or more clutch plates being arranged to be selectively driven in and out of engagement with one another,
   wherein the rotor is mounted on the radially outer surface of the clutch basket.

2. An axial flux machine according to claim 1, wherein the clutch is a wet clutch or a dry clutch.

3. An axial flux machine according to claim 1, wherein the first engagement surface is an input to the machine, and the second engagement surface is an output of the machine.

4. An axial flux machine according to claim 1, wherein the first engagement surface is an output of the machine, and the second engagement surface is an input to the machine.

5. An axial flux machine according to claim 1, wherein the first and/or second engagement surfaces comprise splines for engagement with respective shafts.

6. An axial flux machine according to claim 1, wherein the stator housing defines a chamber incorporating cooling medium in contact with the coils to cool the coils, the stator housing including a port for supply and a port for drainage of the cooling medium.

7. An axial flux machine according to claim 1, wherein the machine is a motor or generator.

8. An axial flux machine according to claim 1, comprising a machine housing enclosing the rotor, the machine housing being mounted to the stator housing.

9. An axial flux machine according to claim 8, comprising a radial bearing between the machine housing and the first engagement surface, and a clutch plate bearer bearing between the machine housing and the second engagement surface, the rotor being co-journaled with the first engagement surface.

10. An axial flux machine according to claim 1, wherein the clutch comprises a clutch piston for driving the sets of clutch plates in and out of engagement with one another.

11. An axial flux machine according to claim 10, comprising a piston spring, for biasing the clutch piston.

12. An axial flux machine according to claim 1, comprising a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction.

13. An axial flux machine according to claim 12, wherein the clutch basket extends axially in the hollow regions and the second rotor is mounted on the clutch basket such that the first and second rotors rotate together.

14. An axial flux machine according to claim 12, comprising a second machine housing enclosing the second rotor, the machine housing being mounted to the stator housing.

* * * * *